United States Patent
Chelstrom et al.

(10) Patent No.: US 7,627,771 B2
(45) Date of Patent: Dec. 1, 2009

(54) CLOCK CONTROL HIERARCHY FOR INTEGRATED MICROPROCESSORS AND SYSTEMS-ON-A-CHIP

(75) Inventors: Nathan P. Chelstrom, Cedar Park, TX (US); Mack W. Riley, Austin, TX (US); Shoji Sawamura, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 961 days.

(21) Appl. No.: 11/242,674

(22) Filed: Oct. 4, 2005

(65) Prior Publication Data

US 2007/0168688 A1 Jul. 19, 2007

(51) Int. Cl.
G06F 1/12 (2006.01)
G06F 13/42 (2006.01)
H04L 5/00 (2006.01)
H04L 7/00 (2006.01)

(52) U.S. Cl. .................. 713/400; 713/324; 713/500; 714/30; 714/34

(58) Field of Classification Search .................. 713/500, 713/324, 400; 714/30, 34
See application file for complete search history.

(56) References Cited

U.S. PATENT DOCUMENTS

| | | | | |
|---|---|---|---|---|
| 5,774,701 A * | 6/1998 | Matsui et al. | ............... | 713/501 |
| 5,928,359 A * | 7/1999 | Lee | ................................ | 713/1 |
| 6,173,386 B1 * | 1/2001 | Key et al. | ..................... | 712/10 |
| 6,662,313 B1 * | 12/2003 | Swanson et al. | .............. | 714/39 |
| 6,792,527 B1 * | 9/2004 | Allegrucci | ..................... | 713/1 |
| 6,950,963 B1 * | 9/2005 | Parson et al. | .................. | 714/30 |
| 7,055,117 B2 * | 5/2006 | Yee | ............................... | 716/4 |
| 7,219,265 B2 * | 5/2007 | Yee | ............................. | 714/30 |
| 7,325,164 B2 * | 1/2008 | Swanson et al. | .............. | 714/30 |
| 2003/0100133 A1 * | 5/2003 | Eidson et al. | ................. | 438/16 |
| 2004/0153838 A1 * | 8/2004 | Swanson et al. | .............. | 714/39 |
| 2005/0076278 A1 * | 4/2005 | Vermeulen et al. | .......... | 714/731 |
| 2005/0149892 A1 * | 7/2005 | Yee | ............................... | 716/4 |
| 2005/0193254 A1 * | 9/2005 | Yee | ............................. | 714/30 |

* cited by examiner

*Primary Examiner*—Thomas Lee
*Assistant Examiner*—Jaweed A Abbaszadeh
(74) *Attorney, Agent, or Firm*—Stephen J. Walder, Jr.; Mathew B. Talpis

(57) ABSTRACT

A clock control hierarchy is provided that is comprised of synchronous and asynchronous hold request signals that are used to start and stop functional units of a chip. Pervasive logic is provided that uses a synchronous "chip hold" signal and asynchronous latch/functional unit hold signals to individually target functional units and latches that are to remain in a held state once the "chip hold" state is released. With the present invention, a chip hold request is first activated followed by scannable latch and non-scannable latch hold requests being activated to identify which latches will be clocked or not clocked when the chip hold is released. Functional unit hold signals are activated to place certain ones of the functional units of the chip in a hold state. The chip hold request is deactivated and the chip operates with the selected functional units and latches being maintained in a held state.

20 Claims, 6 Drawing Sheets

CLOCK CONTROL HIERARCHY FOR INTEGRATED MICROPROCESSORS AND SYSTEMS-ON-A-CHIP

BACKGROUND OF THE INVENTION

1. Technical Field

The present invention relates generally to an improved data processing device. More specifically, the present invention is directed to a clock control hierarchy for integrated microprocessors and systems-on-a-chip in which individual elements of the microprocessors or systems-on-a-chip may be stopped and restarted.

2. Description of Related Art

Highly integrated microprocessor and system-on-a-chip integrated circuits contain many different functional elements. The core logic of microprocessors run with gigahertz clocks. However, when input/output (I/O) and memory devices are incorporated on the same chip, these devices will require different clocking requirements. For a scan based design, i.e. a design in which data is scanned through all of the latch elements of the various functional elements of the microprocessor or system-on-a-chip, the different clocking requirements creates asynchronous boundaries between the core logic and the other functional elements. Scanning across asynchronous clock boundaries is problematic because latch setup and hold times cannot be established reliably between the two clocking environments.

This is especially a problem with debug operations. During debug operations, the desire is to have all digital logic running on the same clock. This will allow the debug engine to scan all latch elements to initialize the chip to a known state. This, however, is not possible with microprocessors or systems-on-a chip that have different clocking domains on the chip. As a result, during debugging, the debug engine must treat each clock domain separately.

During debug operations, it may be desirable to stop one or more functional elements, such as when treating each clock domain separately. For high speed multi-gigahertz systems, such stopping of one or more functional elements may be problematic. This is because known mechanisms require that all of the functional elements be stopped and restarted synchronously. Synchronously stopping the functional elements may require a number of pipeline stages for the instructions in the pipelines of the functional elements to be processed or flushed. For example, in one system architecture, it may take 28 pipeline stages for a functional element to be synchronously stopped. This causes a large overhead with regard to performance of the debug operation when such stopping and restarting of all of the functional elements must be repeated numerous times during a debug operation in order to debug each functional element. No mechanism currently exists for selectively stopping and restarting a functional element individually and asynchronously, with respect to a system clock.

SUMMARY OF THE INVENTION

In view of the above, it would be beneficial to have an improved mechanism for stopping individual functional units of a microprocessor or system-on-a-chip. The present invention provides such a mechanism.

The present invention provides a hierarchy of synchronous and asynchronous hold request signals that are used to start and stop functional units of a microprocessor or system-on-a-chip. The terms "synchronous" and "asynchronous" as they are used in the present description are meant to refer to the clocking of signals relative to a system clock. The present invention minimizes the overhead for synchronization by using a global synchronous chip hold request with many asynchronous hold request signals. Using asynchronous signals saves on area and power by reducing the number of latches to implement the synchronization functionality.

The main concept of the present invention is to provide a central chip hold facility, i.e. a pervasive logic unit, that uses both a synchronous "chip hold" signal and asynchronous latch and unit hold signals to individually target functional units and latches that are to remain in a held state. The signal "chip hold" is a synchronous signal that is fully pipelined to meet overall timing requirements of the chip. When this signal is activated, all functional units of the microprocessor or system-on-a-chip will be stopped. This is the top tier signal in the hierarchy of the present invention.

The next signal group is the scannable latch hold, sl_thold_b, and non-scannable latch hold, nsl_thold_b signal group. These two asynchronous signals are used to determine if the scannable and/or non-scannable latches will be clocked or not clocked when the chip hold is released. The final signal group in the hierarchy of the present invention is the specific unit hold signals. These hold signals are asynchronous as well.

With the present invention, a sequence of operations for activating the hold requests is to first activate the chip hold request. This places all of the clocked functional units in a hold state. Desired scannable latch and non-scannable latch hold requests are activated to thereby identify which latches will be clocked or not clocked when the chip hold is released. Desired unit hold signals are activated to place certain ones of the functional units of the chip in a hold state. Thereafter, the chip hold request is deactivated and the chip is permitted to operate with the selected functional units and latches being maintained in a held state.

With this sequence of synchronous and asynchronous hold requests, and the mechanisms of the present invention, a chip's operation may be stopped synchronously, individual latches and units may be asynchronously stopped, and the chip's operation may be resumed with those individual latches and units that are asynchronously stopped being maintained in an held state, i.e. not clocked. Thus, the mechanisms of the present invention permit the starting and stopping of any unit on the chip. This is especially useful for performing debug operations on a chip.

In one exemplary embodiment of the present invention, a method is provided, in an integrated circuit chip, for stopping individual functional units of the integrated circuit chip. The method may comprise synchronously placing a plurality of functional units of the integrated circuit chip in a chip hold state, asynchronously stopping an operation of a subset of functional units in the plurality of functional units and releasing the chip hold state. The subset of functional units in the plurality of functional units may remain in a stopped state after release of the chip hold state while other functional units of the plurality of functional units are permitted to operate.

Synchronously placing a plurality of functional units of the integrated circuit chip in a chip hold state may comprise synchronously asserting a synchronous chip hold signal to the plurality of functional units. Releasing the chip hold state may comprise de-asserting the synchronous chip hold signal. Asynchronously stopping an operation of a subset of functional units may comprise asynchronously asserting one or more asynchronous functional unit hold signals to the subset of functional units.

The method may further comprise asynchronously asserting one or more latch hold request signals to one or more latches of the integrated circuit chip. Moreover, the method may comprise re-asserting the synchronous chip hold signal to the plurality of functional units to thereby again place the plurality of functional units in a chip hold state, de-asserting the one or more individual functional unit hold signals to the subset of functional units, and de-asserting the re-asserted synchronous chip hold signal.

Values in a hold control register may be set to identify which functional units in the plurality of functional units are to be placed in a hold state. The one or more individual functional unit hold signals may be asserted based on the setting of values in the hold control register.

Furthermore, in response to receiving the asynchronous functional unit hold signals, the subset of functional units may not be clocked by the system clock until the asynchronous functional unit hold signals are de-asserted. In addition, the chip hold signal may be released for a precise number of cycles as determined by a counter.

Moreover, the method may further comprise performing a debug operation for a predetermined number of cycles after release of the chip hold state. In addition, a determination may be made as to whether a non-recoverable error occurs during the debug operation and the plurality of functional units may be placed in a chip hold state in response to a non-recoverable error occurring during the debug operation.

In a further embodiment of the present invention, an apparatus, is provided that comprises a hold control register and hold request generation logic coupled to the hold control register. A setting of values in the hold control register controls an operation of the hold request generation logic such that the hold request generation logic performs the following operations: (1) synchronously placing a plurality of functional units of the integrated circuit chip in a chip hold state; (2) asynchronously stopping an operation of a subset of functional units in the plurality of functional units; and (3) releasing the chip hold state. The subset of functional units in the plurality of functional units may remain in a stopped state after release of the chip hold state while other functional units of the plurality of functional units are permitted to operate. The apparatus may further comprise a controller coupled to the hold control register, which controls performance of a debug operation for a predetermined number of cycles after release of the chip hold state. In addition, the apparatus may include error detection logic coupled to the hold request generation logic, that determines if a non-recoverable error occurs during the debug operation and instructs the hold request generation logic to place the plurality of functional units in a chip hold state in response to a non-recoverable error occurring during the debug operation.

These and other features and advantages of the present invention will be described in, or will become apparent to those of ordinary skill in the art in view of, the following detailed description of the exemplary embodiments of the present invention.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENTS

Figure 1:
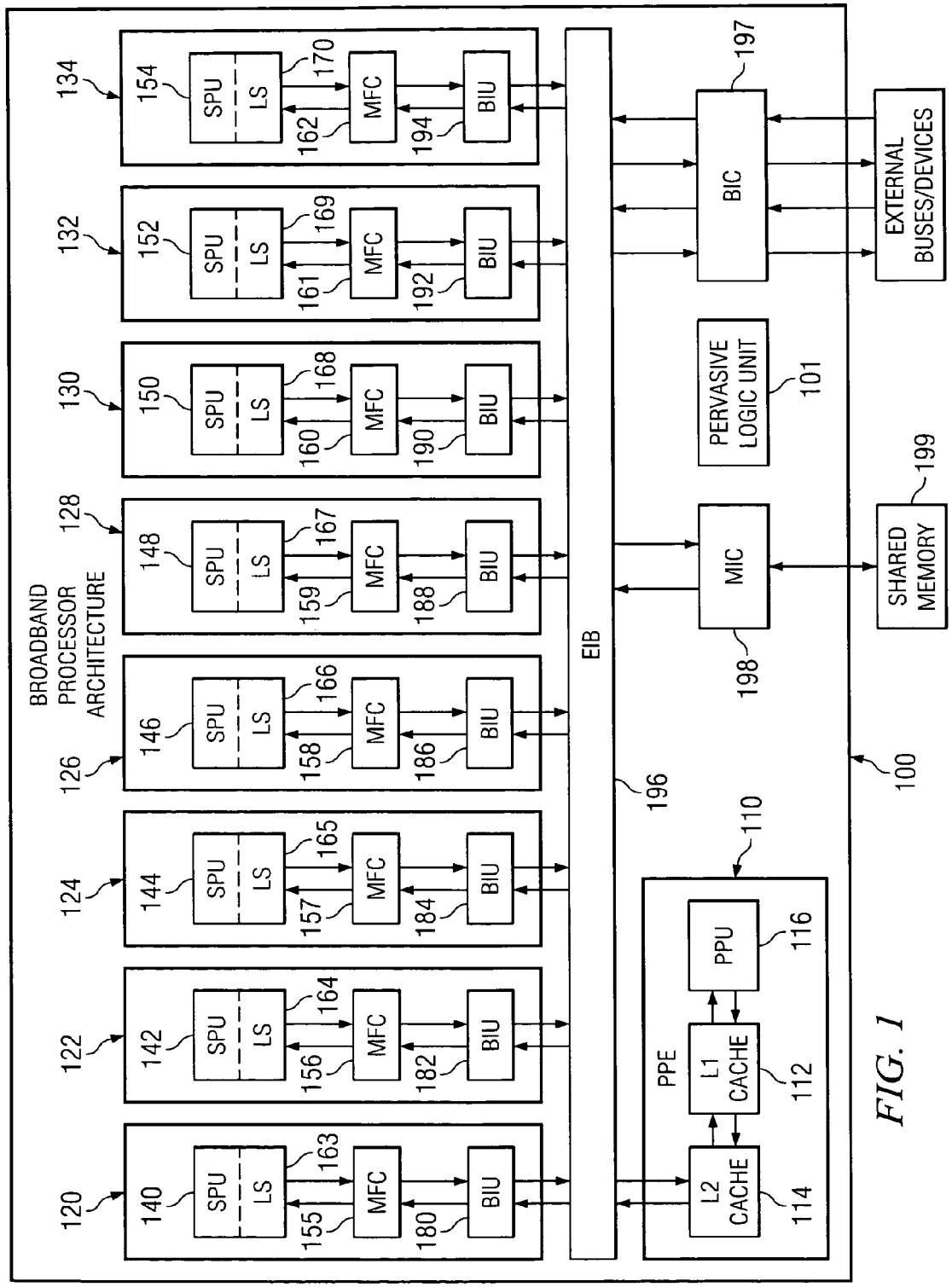
FIG. 1 is an exemplary block diagram of a microprocessor chip in which aspects of the present invention may be implemented.

The present invention provides an apparatus and method for providing a clock control hierarchy for integrated microprocessors and systems-on-a-chip (SOCs) in order to permit the stopping and starting of, individual functional units within such microprocessors and SOCs. The mechanisms of the present invention may be implemented in any microprocessor or SOC in which individual functional units of the microprocessor or SOC need to be stopped and restarted, such as to perform debug operations on the microprocessor or SOC. One such exemplary microprocessor chip is the CELL Broadband Engine (CBE) microprocessor available from International Business Machines Corporation or Armonk, N.Y. FIG. 1 provides an exemplary block diagram of a microprocessor employing the CBE architecture. It should be appreciated that the exemplary microprocessor shown in FIG. 1 is only exemplary and is not intended to state or imply any limitation with regard to the data processing systems or environments in which the aspects of the present invention may be implemented.

As stated above, FIG. 1 is an exemplary block diagram of a microprocessor chip in which aspects of the present invention may be implemented. The exemplary data processing system shown in FIG. 1 is an example of the CELL Broadband Engine (CBE) data processing system. While the CBE will be used in the description of the preferred embodiments of the present invention, the present invention is not limited to such, as will be readily apparent to those of ordinary skill in the art upon reading the following description.

As shown in FIG. 1, the CBE 100 includes a power processor element (PPE) 110 having a processor (PPU) 116 and its L1 and L2 caches 112 and 114, and multiple synergistic processor elements (SPEs) 120-134 that each has its own synergistic processor unit (SPU) 140-154, memory flow control 155-162, local memory or store (LS) 163-170, and bus interface unit (BIU unit) 180-194 which may be, for example, a combination direct memory access (DMA), memory management unit (MMU), and bus interface unit. A high bandwidth internal element interconnect bus (EIB) 196, a bus interface controller (BIC) 197, and a memory interface controller (MIC) 198 are also provided.

The CBE 100 may be a system-on-a-chip such that each of the elements depicted in FIG. 1 may be provided on a single microprocessor chip. Moreover, the CBE 100 is a heterogeneous processing environment in which each of the SPUs may receive different instructions from each of the other SPUs in the system. Moreover, the instruction set for the SPUs is different from that of the PPU, e.g., the PPU may execute Reduced Instruction Set Computer (RISC) based instructions while the SPU execute vectorized instructions.

The SPEs 120-134 are coupled to each other and to the L2 cache 114 via the EIB 196. In addition, the SPEs 120-134 are coupled to MIC 198 and BIC 197 via the EIB 196. The MIC 198 provides a communication interface to shared memory 199. The BIC 197 provides a communication interface between the CBE 100 and other external buses and devices.

The PPE 110 is a dual threaded PPE 110. The combination of this dual threaded PPE 110 and the eight SPEs 120-134 makes the CBE 100 capable of handling 10 simultaneous threads and over 128 outstanding memory requests. The PPE 110 acts as a controller for the other eight SPEs 120-134 which handle most of the computational workload. The PPE 110 may be used to run conventional operating systems while the SPEs 120-134 perform vectorized floating point code execution, for example.

The SPEs 120-134 comprise a synergistic processing unit (SPU) 140-154, memory flow control units 155-162, local memory or store 163-170, and an interface unit 180-194. The local memory or store 163-170, in one exemplary embodiment, comprises a 256 KB instruction and data memory which is visible to the PPE 110 and can be addressed directly by software.

The PPE 110 may load the SPEs 120-134 with small programs or threads, chaining the SPEs together to handle each step in a complex operation. For example, a set-top box incorporating the CBE 100 may load programs for reading a DVD, video and audio decoding, and display, and the data would be passed off from SPE to SPE until it finally ended up on the output display. At 4 GHz, each SPE 120-134 gives a theoretical 32 GFLOPS of performance with the PPE 110 having a similar level of performance.

The memory flow control units (MFCs) 155-162 serve as an interface for an SPU to the rest of the system and other elements. The MFCs 155-162 provide the primary mechanism for data transfer, protection, and synchronization between main storage and the local storages 163-170. There is logically an MFC for each SPU in a processor. Some implementations can share resources of a single MFC between multiple SPUs. In such a case, all the facilities and commands defined for the MFC must appear independent to software for each SPU. The effects of sharing an MFC are limited to implementation-dependent facilities and commands.

With the microprocessor shown in FIG. 1, it may be desirable, such as during a debug operation, to individually stop one or more of the functional units of the microprocessor in order to test the functionality of other units of the microprocessor. Thus, for example, it may be desirable to individually stop one or more of the PPU 116, the SPUs 140-154, the MFCs 155-162, the L2 cache 114, the MIC 198, the BIC 197, latches in arrays of these functional units, or other functional units of the microprocessor. The present invention provides the pervasive logic unit 101 which is used to control hold signals that are sent to individual functional units, latches, etc. of the microprocessor in order to place selected ones of these functional units, latches, etc. in a hold state while other functional units, latches, etc. remain in an operational state.

The pervasive logic unit 101 uses a synchronous chip hold signal to place all of the functional units, latches, etc. in a hold state. Asynchronous hold signals are then activated for selected ones of the functional units, latches, and the like, to place these functional units in a hold state even after release of the chip hold state. Thereafter, the chip hold state is released and those functional units of the microprocessor that were not targeted by an activated asynchronous hold signal are permitted to operate in a normal fashion while those functional units receiving the asynchronous hold signals are placed in a held state.

Thus, the pervasive logic unit 101 makes use of a hierarchy of synchronous and asynchronous hold request signals that are used to start and stop functional units of a microprocessor or system-on-a-chip. With the present invention, a sequence of operations for activating the hold requests is to first activate the synchronous chip hold request. This places all of the clocked functional units in a hold state. Desired scannable latch and non-scannable latch hold requests are activated to thereby identify which latches will be clocked or not clocked when the chip hold is released. Desired unit hold signals are activated to place certain ones of the functional units of the chip in a hold state. Thereafter, the chip hold request is deactivated and the chip is permitted to operate with the selected functional units and latches being maintained in a held state.

With this sequence of synchronous and asynchronous hold requests, and the mechanisms of the present invention, a chip's operation may be stopped synchronously, individual latches and units may be asynchronously held, and the chip's operation may be resumed with those individual latches and units that are asynchronously held being maintained in a stopped state, i.e. not clocked. Thus, the mechanisms of the present invention permit the starting and stopping of any unit on the chip.

Figure 2:
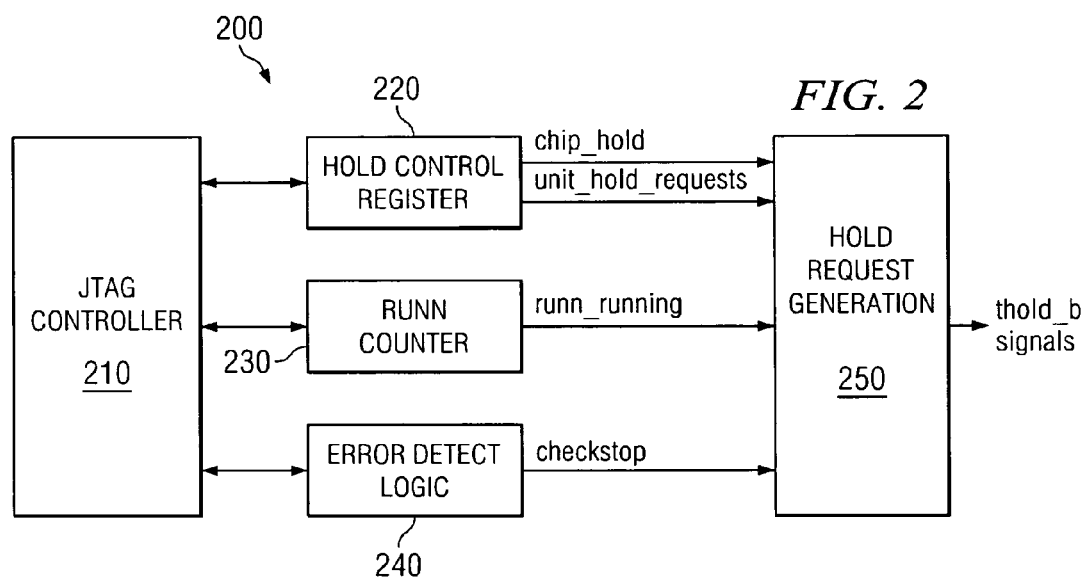
FIG. 2 is an exemplary block diagram illustrating the primary operational elements of a pervasive logic unit in accordance with one exemplary embodiment of the present invention.

FIG. 2 is an exemplary block diagram illustrating the primary operational elements of a pervasive logic unit in accordance with one exemplary embodiment of the present invention. As shown in FIG. 2, the pervasive logic unit 200 includes a Joint Test Action Group (JTAG) controller 210, a hold control register 220, a RUNN counter 230, error detection logic 240, and a hold request generation logic 250. The Joint Test Action Group (JTAG) controller 210 provides an on-chip debug interface through which the individual functional units of the microprocessor may be exercised and tested. The JTAG controller implements the IEEE 1149.1 standard for using a Test Access Port and Boundary Scan of processors and functional units of the microprocessor. JTAG controllers for debugging of processors are generally known in the art and thus, a detailed description of JTAG controllers is not included herein.

The JTAG controller 210 communicates debug configuration information to the hold control register 220, RUNN counter 230, and error detect logic 240. The JTAG controller 210 further receives signals back from these elements 220-240 identifying when chip and unit hold requests are dispatched to the hold request generation 250, when the RUNN counter 230 counts to a predetermined value, detected errors, and the like. The JTAG controller 210 controls the overall operation of the pervasive logic unit 200.

For a read operation, the JTAG controller 210 may be thought of as a device that outputs an address and data for a write operation. For a read operation, the JTAG controller 210 outputs an address and gets data back from the device that is addressed. The address and write data are provided to the JTAG controller 210 by an off-chip processor. Thus, from the perspective of the JTAG controller 210, each of the hold control register 220, RUNN counter 230, and error detect logic 240 may be viewed as simple registers, each with a specific address. Outputs from these registers (e.g., hold signals) drive other logic on the chip. Moreover, the JTAG controller 210, under software control by an external processor, may read the above hold control register 220, RUNN counter 230, and error detect logic 240 to obtain the contents of these devices.

The JTAG controller 210 sets values in the hold control register 220 to identify which units are to be placed in a hold state. Based on the setting of these values in the hold control register 220 one or more output signals, unit_hold_requests, are output to the hold request generation logic 250 identifying which functional units on the chip are to be placed in a hold state. The hold control register 220 first issues a chip_hold signal to the hold request generation logic 250 which causes the hold request generation logic 250 to output individual hold signals to all of the functional units of the chip. Thereafter, the hold control register 220 outputs the unit_hold_requests signal(s) to the hold request generation logic 250 which causes selected unit hold signals to be asserted. The chip_hold signal is then de-asserted and the hold request generation logic 250 outputs hold signals for those selected functional units that were to be placed in a hold state. These hold signals are sent to the individual selected functional units which, in response to receiving such hold signals, are not clocked by the system clock until the hold signal is deasserted.

The RUNN counter 230 asserts a runn_running signal to the hold request generation logic 250 which causes the hold request generation logic 250 to release the chip hold signal for a precise number of cycles. In other words, the RUNN counter 230 counts a number of system clock cycles, as configured by the input from JTAG controller 210, to provide a period in which individual unit hold signals are used to place individual functional units of the chip in a hold state for performing debug operations, for example.

The error detect logic 240 detects errors in the operation of functional units of the chip. If an unresolvable error occurs, the error detect logic 240 may issue a checkstop signal to the hold request generation logic 250. This checkstop signal causes all of the functional units to be placed in a hold state as if a chip_hold signal were asserted.

Figure 3A:
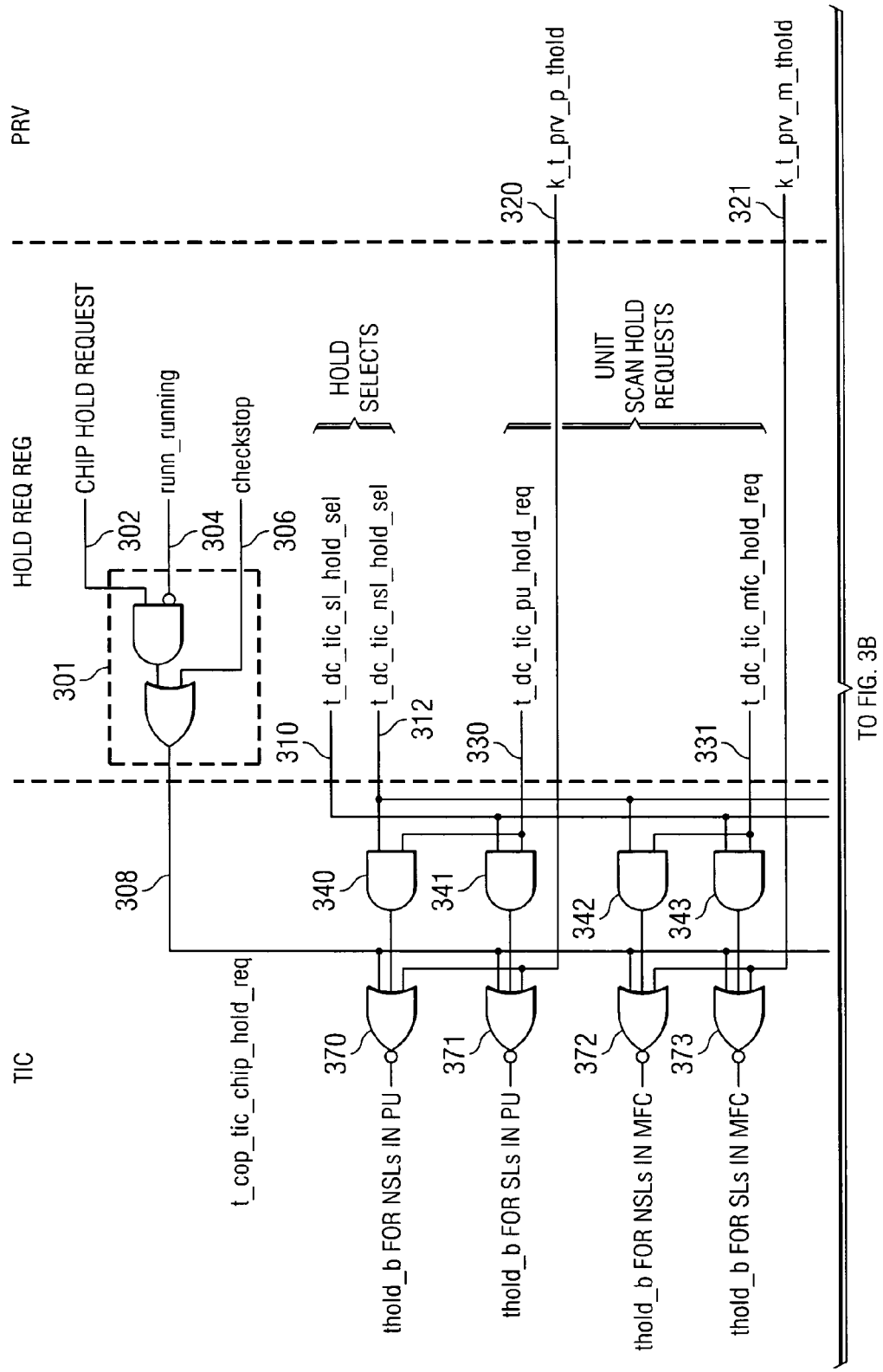
FIGS. 3A-3C provide an exemplary diagram illustrating a hold request generation unit in accordance with one exemplary embodiment of the present invention.
Figure 3B:
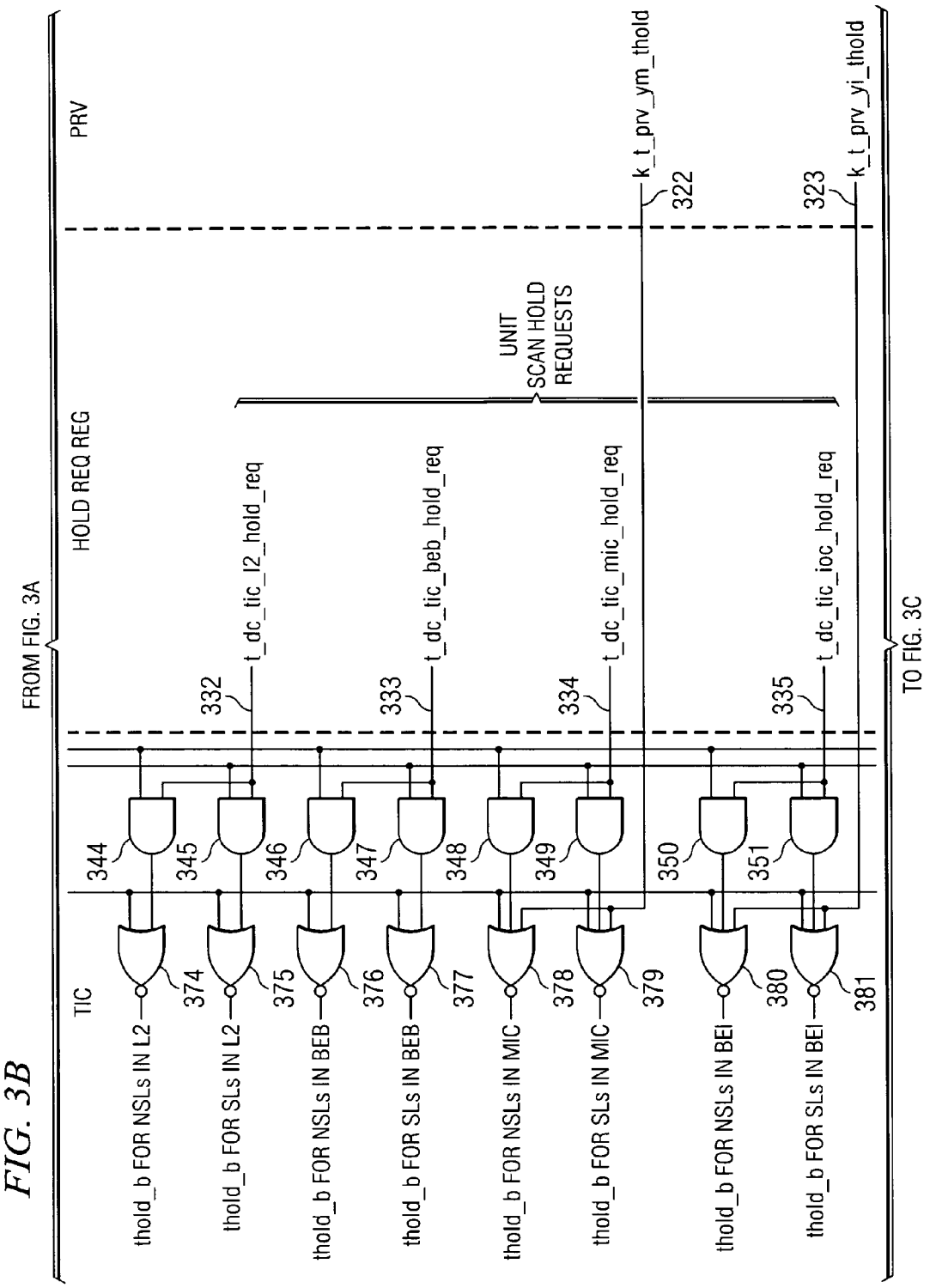
Figure 3C:
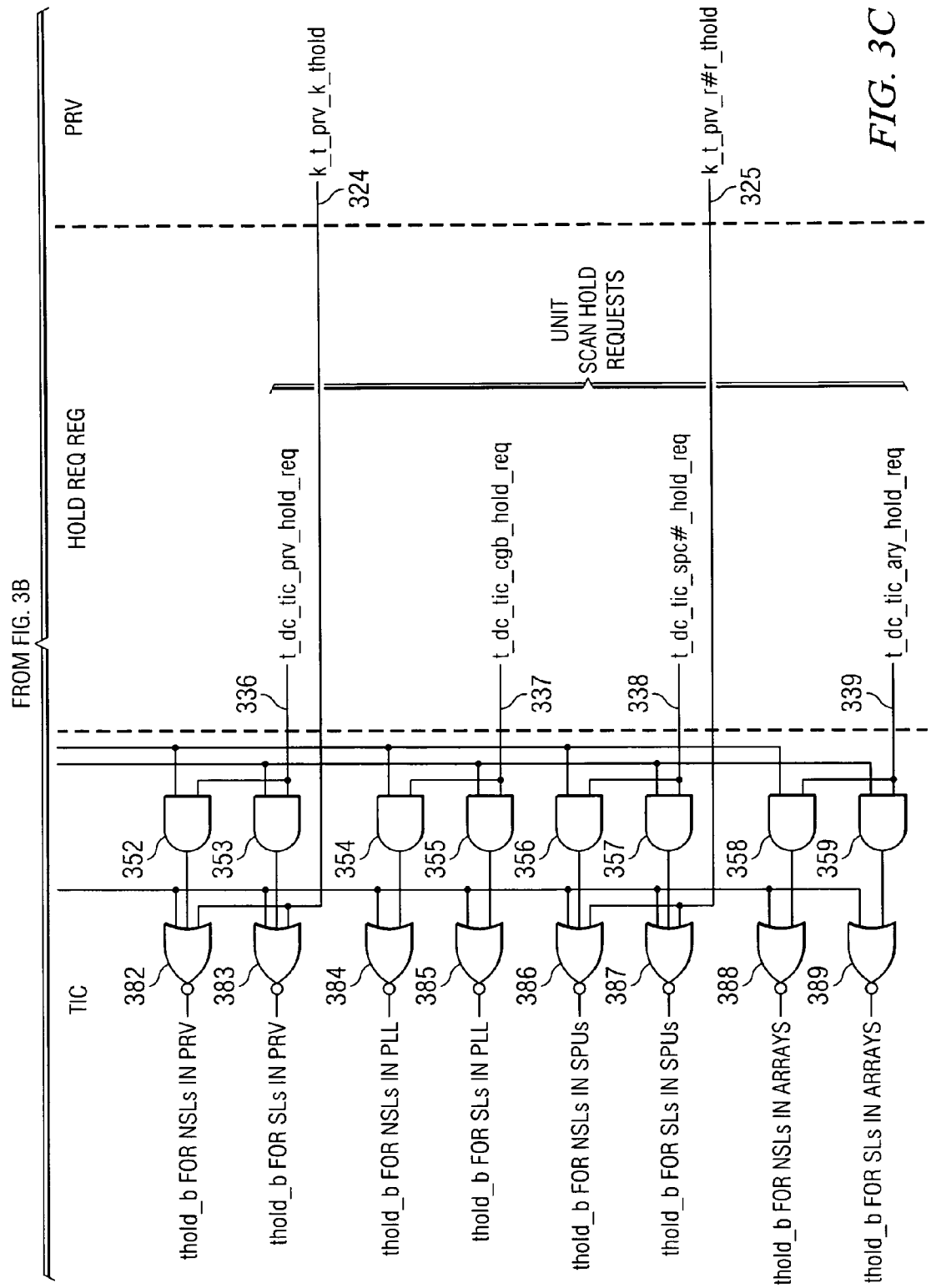

FIGS. 3A-3C provide an exemplary diagram illustrating a hold request generation unit in accordance with one exemplary embodiment of the present invention. As shown in FIGS. 3A-3C, the hold request generation logic 300 receives a chip hold request signal 302, e.g., chip_hold signal from hold control register 220 in FIG. 2, a runn_running signal 304, such as from RUNN counter 230 in FIG. 2, and checkstop signal 306, such as from error detect logic 240. These signals are provided to chip hold logic 301 which outputs a chip hold request signal based on these input signals. As shown, if the chip hold request signal 302 is asserted and the runn_running signal 304 is de-asserted, the output to the OR gate of the chip hold logic 301 is high. If either the output from the AND gate in the chip hold logic 301 is high or the checkstop signal 306 is high, then the OR gate of the chip hold logic 301 outputs a chip hold signal 308, e.g., the t_cop_tic_chip_hold_req signal, to the OR gates 370-389.

In addition, the hold request generation logic 300 receives pervasive logic unit hold signals 320-325 from the pervasive logic unit, e.g., pervasive logic unit 200 in FIG. 2. These pervasive logic unit hold signals 320-325 identify which of the functional units, e.g., the power processing unit (PPU), the memory flow controllers (MFCs), the memory interface controller (MIC), the element interconnect bus (EIB), the pervasive logic unit (PRV), the synergistic processing units (SPUs), and the like, are to be placed in a hold state.

The hold control register 220 provides hold request signals 330-339 for placing each functional unit of the chip. These hold request signals 330-339 are only driven when the hold control register 220 is written to. The default state of the hold control register 220 is for all units to not be held. The hold request signals 330-339 are sent in response to the JTAG controller 210 receiving commands from software to activate the hold request signals. Normally, the JTAG controller 210 is connected to an external computer that runs debug software that provides such commands to the JTAG controller 210.

However, other mechanisms for initiating the sending of these hold request signals 330-339 may be used without departing from the spirit and scope of the present invention. In addition to the above, the hold control register 220 also provides scannable latch and/or non-scannable latch hold signals 310 and 312.

Hold control register signals 330-339 and the scannable latch and non-scannable latch hold signals 310 and 312 are provided to AND gates 340-359. The AND gates 340-359 are provided in pairs with each pair having one AND gate for scannable latch hold signals 310 and another AND gate for non-scannable latch hold signals 312. The hold control register signals 330-339 are provided to each AND gate in the respective pair and one of the scannable latch hold signal 310 and the non-scannable latch hold signal 312 is provided to each AND gate in the pair. Thus, for example, if both the non-scannable latch hold signal 312 and the hold control register PPU hold signal 330 are asserted, then the AND gate 340 will assert an output signal to the OR gate 370. This same operation is performed by each AND gate 340-359 based on whether or not one or more of the input signals to the AND gates 340-359 are asserted.

The OR gates 370-389 receive, as inputs, the output from AND gates 340-359, respectively, and the chip hold request signal 308 from the chip hold logic 301. As shown, the OR gates 370-389 are provided in pairs with one OR gate in the pair being associated with scannable latch hold signals and the other OR gate in the pair being associated with non-scannable latch hold signals. In addition, certain ones of the OR gates 370-389 receive the PRV hold signals 320-325 from the pervasive logic unit, e.g., pervasive logic unit 200 in FIG. 2. If any of the inputs to the OR gates 370-389 are high, then the OR gate outputs the associated hold signal, i.e. the thold_b signal. This hold signal essentially cause the functional unit to not be clocked until the hold signal is released.

Thus, it can be seen from the circuit diagram shown in FIGS. 3A-3C that if the chip hold request is asserted, all of the functional units are placed in a hold state. If any one of the chip hold request signal 308, the individual unit hold request signal 330-339, or the PRV hold request signal 320-325 are asserted, then the corresponding functional unit is placed in a hold state. With this in mind, the present invention asserts the chip hold request signal 308 in a synchronous manner to thereby place each of the functional units in a hold state. Thereafter, individual ones of the hold request register signals 330-339 and/or PRV hold signals 320-325 are asserted asynchronously to continue to place selected ones of the functional units in a hold state. The chip hold request signal 308 is then de-asserted and those functional units that were not selected for receiving an asynchronous hold request register signal 330-339 or PRV hold signal 320-325 are allowed to run. Those functional units that were selected to receive an asynchronous hold request register signal 330-339 or PRV hold signal 320-325 are placed in a hold state. Thus, the present invention provides a mechanism for individually stopping functional units on a chip, such as to perform debug operations.

In order to restart previously stopped functional units, a similar operation may be performed. That is, all of the functional units may again be stopped by asserting the synchronous chip hold request signal 308. Thereafter, the asynchronous unit hold signals, e.g., hold request register signals 330-339 and/or PRV hold signals 320-325, may be de-asserted such that the corresponding functional units are no longer placed in a hold state outside of the chip hold request signal 308 being asserted. Then, the chip hold request signal 308 may be de-asserted and, as a result, all of the functional units of the chip are again permitted to operate in a normal fashion.

The assertion and de-assertion of the chip hold request signal 308 may be controlled by the RUNN counter 230 via the assertion of the runn_running signal 304. That is, the chip hold request signal may be continuously asserted with the RUNN counter 230 asserting and de-asserting the runn_running signal 304 based on the count performed by the RUNN counter 230. Based on the chip hold logic 301, through the assertion and de-assertion of the runn_running signal 304 by the RUNN counter 230, the output of the chip hold request signal 308 from the chip hold logic 301 may be controlled.

Figure 4:
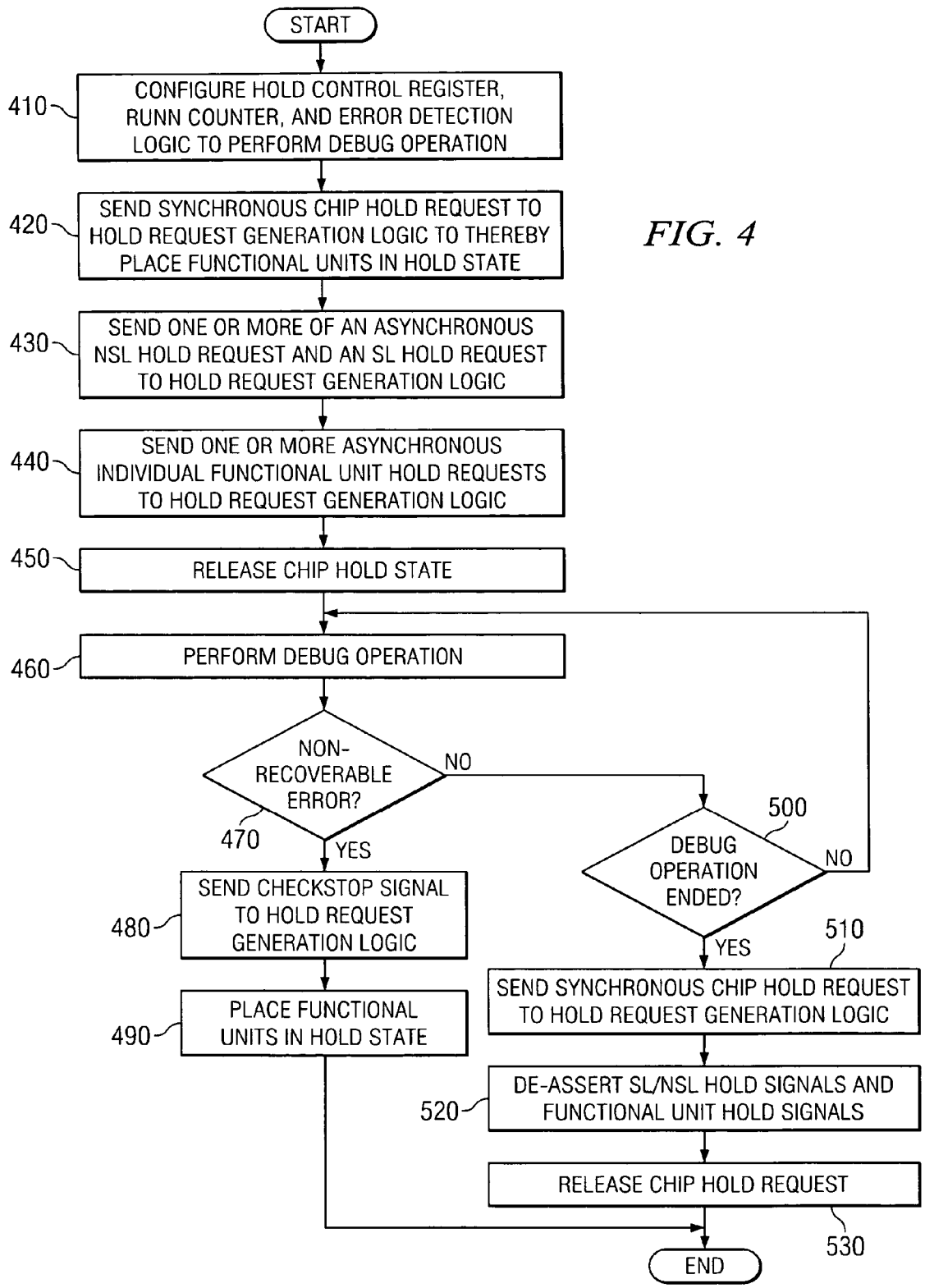
FIG. 4 is a flowchart outlining an exemplary operation of one exemplary embodiment of the present invention for stopping individual functional units within a system-on-a-chip, performing a debug operation, and then restarting those stopped functional units.

FIG. 4 is a flowchart outlining an exemplary operation of one exemplary embodiment of the present invention for stopping individual functional units within a system-on-a-chip, performing a debug operation, and then restarting those stopped functional units. It will be understood that each block of the flowchart illustration, and combinations of blocks in the flowchart illustration, can be implemented by computer program instructions. These computer program instructions may be provided to a processor or other programmable data processing apparatus to produce a machine, such that the instructions which execute on the processor or other programmable data processing apparatus create means for implementing the functions specified in the flowchart block or blocks. These computer program instructions may also be stored in a computer-readable memory or storage medium that can direct a processor or other programmable data processing apparatus to function in a particular manner, such that the instructions stored in the computer-readable memory or storage medium produce an article of manufacture including instruction means which implement the functions specified in the flowchart block or blocks.

Accordingly, blocks of the flowchart illustration support combinations of means for performing the specified functions, combinations of steps for performing the specified functions and program instruction means for performing the specified functions. It will also be understood that each block of the flowchart illustration, and combinations of blocks in the flowchart illustration, can be implemented by special purpose hardware-based computer systems which perform the specified functions or steps, or by combinations of special purpose hardware and computer instructions.

As shown in FIG. 4 the operation starts by configuring the hold control register, RUNN counter, and error detection logic to perform a debug operation (step 410). A synchronous chip hold request is then sent to the hold request generation logic which causes all of the functional units of the chip to be placed in a hold state (step 420). Thereafter, one or more of an asynchronous non-scannable latch hold request and an asynchronous scannable latch hold request are sent to the hold request generation logic to thereby identify which latches are to be placed in a hold state (step 430). One or more asynchronous individual functional unit hold requests may be provided to the hold request generation logic based on the configuration of the hold control register to thereby identify individual functional units that are to remain in a hold state after release of the chip hold (step 440). The chip hold state is then released (step 450) and a debug operation is performed for a predetermined number of cycles, as determined by the RUNN counter, for example (step 460).

A determination is made, such as by using the error detect logic, as to whether a non-recoverable error occurs during the debug operation (step 470). If so, a checkstop signal is sent to the hold request generation logic (step 480) which then places all of the functional units of the chip in a hold state (step 490). If a non-recoverable error does not occur, a determination is made as to whether the debug operation has ended (step 500). If not, the operation returns to step 460. If the debug operation has ended, e.g., the RUNN counter has reached a predetermined value, the synchronous chip hold request is re-sent to the hold request generation logic (step 510). The asynchronous individual functional unit hold requests are then de-asserted (step 520) and the chip hold request is released (step 530). The operation then terminates.

Thus, the present invention provides a mechanism by which a hierarchy of synchronous and asynchronous hold requests are used to place individual functional units of a chip in a hold state. By using the hierarchy and circuitry of the present invention, the number of latches that are required in order to perform debug operations on individual functional units is minimized. This is because the asynchronous unit hold signals do not require pipeline latches. In addition, because the present invention may asynchronously stop individual functional units of the chip, the numerous pipeline stages that are required to stop each functional unit on the chip are avoided.

The circuit as described above is part of the design for an integrated circuit chip. The chip design is created in a graphical computer programming language, and stored in a computer storage medium (such as a disk, tape, physical hard drive, or virtual hard drive such as in a storage access network). If the designer does not fabricate chips or the photolithographic masks used to fabricate chips, the designer transmits the resulting design by physical means (e.g., by providing a copy of the storage medium storing the design) or electronically (e.g., through the Internet) to such entities, directly or indirectly. The stored design is then converted into the appropriate format (e.g., GDSII) for the fabrication of photolithographic masks, which typically include multiple copies of the chip design in question that are to be formed on a wafer. The photolithographic masks are utilized to define areas of the wafer (and/or the layers thereon) to be etched or otherwise processed.

The resulting integrated circuit chips can be distributed by the fabricator in raw wafer form (that is, as a single wafer that has multiple unpackaged chips), as a bare die, or in a packaged form. In the latter case the chip is mounted in a single chip package (such as a plastic carrier, with leads that are affixed to a motherboard or other higher level carrier) or in a multichip package (such as a ceramic carrier that has either or both surface interconnections or buried interconnections). In any case the chip is then integrated with other chips, discrete circuit elements, and/or other signal processing devices as part of either (a) an intermediate product, such as a motherboard, or (b) an end product. The end product can be any product that includes integrated circuit chips, ranging from toys and other low-end applications to advanced computer products having a display, a keyboard or other input device, and a central processor, such as a portable, laptop, or desktop computer, a game machine or console, handheld computing device, personal digital assistant, or the like.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method, in an integrated circuit chip, for stopping individual functional units of the integrated circuit chip, comprising:
   synchronously placing a plurality of functional units of the integrated circuit chip in a chip hold state;
   asynchronously stopping an operation of a subset of functional units in the plurality of functional units; and
   releasing the chip hold state, wherein the subset of functional units in the plurality of functional units remains in a stopped state after release of the chip hold state while other functional units of the plurality of functional units are permitted to operate.

2. The method of claim 1, wherein synchronously placing a plurality of functional units of the integrated circuit chip in a chip hold state comprises synchronously asserting a synchronous chip hold signal to the plurality of functional units, and wherein releasing the chip hold state comprises de-asserting the synchronous chip hold signal.

3. The method of claim 2, wherein asynchronously stopping an operation of a subset of functional units comprises asynchronously asserting one or more asynchronous functional unit hold signals to the subset of functional units.

4. The method of claim 3, further comprising:
   asynchronously asserting one or more latch hold request signals to one or more latches of the integrated circuit chip.

5. The method of claim 3, further comprising:
   re-asserting the synchronous chip hold signal to the plurality of functional units to thereby again place the plurality of functional units in a chip hold state;
   de-asserting the one or more individual functional unit hold signals to the subset of functional units; and
   de-asserting the re-asserted synchronous chip hold signal.

6. The method of claim 3, further comprising setting values in a hold control register to identify which functional units in the plurality of functional units are to be placed in a hold state, wherein the one or more individual functional unit hold signals are asserted based on the setting of values in the hold control register.

7. The method of claim 3, wherein in response to receiving the asynchronous functional unit hold signals, the subset of functional units are not clocked by the system clock until the asynchronous functional unit hold signals are de-asserted.

8. The method of claim 3, wherein the chip hold signal is released for a precise number of cycles as determined by a counter.

9. The method of claim 1, further comprising:
   performing a debug operation for a predetermined number of cycles after release of the chip hold state.

10. The method of claim 9, further comprising:
    determining if a non-recoverable error occurs during the debug operation; and
    placing the plurality of functional units in a chip hold state in response to a non-recoverable error occurring during the debug operation.

11. An apparatus, comprising:
    a hold control register; and
    hold request generation logic coupled to the hold control register, wherein a setting of values in the hold control register controls an operation of the hold request generation logic such that the hold request generation logic performs the following operations:
        synchronously placing a plurality of functional units of the integrated circuit chip in a chip hold state;
        asynchronously stopping an operation of a subset of functional units in the plurality of functional units; and
        releasing the chip hold state, wherein the subset of functional units in the plurality of functional units remains in a stopped state after release of the chip hold state while other functional units of the plurality of functional units are permitted to operate.

12. The apparatus of claim 11, wherein the hold request generation logic synchronously places the plurality of functional units of the integrated circuit chip in the chip hold state by synchronously asserting a synchronous chip hold signal to the plurality of functional units, and wherein the hold request generation logic releases the chip hold state by de-asserting the synchronous chip hold signal.

13. The apparatus of claim 12, wherein the hold request generation logic asynchronously stops an operation of the subset of functional units by asynchronously asserting one or more asynchronous functional unit hold signals to the subset of functional units.

14. The apparatus of claim 13, wherein the hold request generation logic asynchronously asserts one or more latch hold request signals to one or more latches of the integrated circuit chip.

15. The apparatus of claim 13, wherein the hold request generation logic:
    re-asserts the synchronous chip hold signal to the plurality of functional units to thereby again place the plurality of functional units in a chip hold state;
    de-asserts the one or more individual functional unit hold signals to the subset of functional units; and
    de-asserts the re-asserted synchronous chip hold signal.

16. The apparatus of claim 13, wherein the values in the hold control register identify which functional units in the plurality of functional units are to be placed in a hold state, and wherein the one or more individual functional unit hold signals are asserted based on the setting of values in the hold control register.

17. The apparatus of claim 13, wherein in response to receiving the asynchronous functional unit hold signals, the subset of functional units are not clocked by the system clock until the asynchronous functional unit hold signals are de-asserted.

18. The apparatus of claim 13, wherein the chip hold signal is released for a precise number of cycles as determined by a counter.

19. The apparatus of claim 11, further comprising:
    a controller coupled to the hold control register, wherein the controller controls performance of a debug operation for a predetermined number of cycles after release of the chip hold state.

20. The apparatus of claim 19, further comprising:
    error detection logic coupled to the hold request generation logic, wherein the error detection logic determines if a non-recoverable error occurs during the debug operation and instructs the hold request generation logic to place the plurality of functional units in a chip hold state in response to a non-recoverable error occurring during the debug operation.

* * * * *